United States Patent
Takahashi et al.

(10) Patent No.: US 8,973,727 B1
(45) Date of Patent: Mar. 10, 2015

(54) ELECTROMAGNETIC CLUTCH

(71) Applicants: Toshio Takahashi, Gunma (JP); Hiroyasu Yoshihara, Gunma (JP); Miyuki Arai, Gunma (JP)

(72) Inventors: Toshio Takahashi, Gunma (JP); Hiroyasu Yoshihara, Gunma (JP); Miyuki Arai, Gunma (JP)

(73) Assignee: Ogura Clutch Co., Ltd., Kiryu-Shi, Gunma (JP)

( * ) Notice: Subject to any disclaimer, the term of this patent is extended or adjusted under 35 U.S.C. 154(b) by 0 days.

(21) Appl. No.: 14/014,287

(22) Filed: Aug. 29, 2013

(51) Int. Cl.
*B60W 10/02* (2006.01)
*B60W 10/18* (2012.01)
*F16D 67/06* (2006.01)
*F16D 27/04* (2006.01)

(52) U.S. Cl.
CPC .................................. *F16D 27/04* (2013.01)
USPC ............... 192/18 B; 192/110 B; 192/84.961; 192/84.96; 192/84.94

(58) Field of Classification Search
USPC ....................................................... 192/18 B
See application file for complete search history.

(56) References Cited

U.S. PATENT DOCUMENTS

| | | | | |
|---|---|---|---|---|
| 3,752,279 A | * | 8/1973 | Briar | 192/84.941 |
| 4,566,574 A | * | 1/1986 | Marshall | 192/84.91 |
| 5,924,537 A | * | 7/1999 | Tobayama et al. | 192/84.961 |
| 5,984,069 A | * | 11/1999 | Takahashi | 192/84.961 |
| 7,975,818 B2 | * | 7/2011 | Pardee | 192/18 B |
| 2007/0209896 A1 | * | 9/2007 | Pardee | 192/18 B |

FOREIGN PATENT DOCUMENTS

| | | |
|---|---|---|
| JP | S59-133840 A | 8/1984 |
| JP | S59-133845 U | 9/1984 |
| JP | H07-190095 A | 7/1995 |

* cited by examiner

*Primary Examiner* — Rodney H Bonck
*Assistant Examiner* — Timothy Hannon
(74) *Attorney, Agent, or Firm* — Blakely Sokoloff Taylor & Zafman

(57) ABSTRACT

An electromagnetic clutch includes a first rotation transmission portion, annular field core, rotation stop member, second rotation transmission portion, armature, and spring member. The annular field core is supported by the first rotation transmission portion via a first bearing. The first bearing is housed in a hollow portion of the field core and fitted on an inner circumferential surface of the field core. The rotation stop member includes a flat portion which is fixed to an end of the field core on a side opposite to the armature. The flat portion is formed integrally with a retaining piece which projects toward the hollow portion of the field core and faces the first bearing when viewed from the axial direction of the field core.

5 Claims, 5 Drawing Sheets

PRIOR ART

ELECTROMAGNETIC CLUTCH

BACKGROUND OF THE INVENTION

The present invention relates to an electromagnetic clutch used as a power transmission device for a lawn mower, snow blower, and the like and, more particularly, to an electromagnetic clutch including a brake mechanism for preventing inertial rotation and idling on the output side after cutting off power transmission.

A conventional electromagnetic clutch of this type has, e.g., a structure as shown in FIG. 5. As shown in FIG. 5, an electromagnetic clutch 1 is mounted on an input shaft 2 extending in the horizontal direction (right-and-left direction in FIG. 5). For descriptive convenience, the distal end side (right side in FIG. 5) of the input shaft 2 will be defined as the front side of the electromagnetic clutch 1, and the opposite side will be defined as the back side of the electromagnetic clutch 1.

The input shaft 2 is driven to rotate by an engine (not shown), a motor (not shown), or the like. A pulley 3 and a rotor 4 of the electromagnetic clutch 1 are mounted on the input shaft 2 to be aligned in the axial direction so that they rotate integrally by so-called key fitting. More specifically, the pulley 3 and rotor 4 have projections 3a and 4a at their inner circumferential portions, and are attached to the input shaft 2 so that the projections 3a and 4a are fitted in a key groove 2a of the input shaft 2.

The pulley 3 transmits power to a power transmission path for driving the wheel (not shown) of the lawn mower. The pulley 3 is positioned on the back side with respect to the rotor 4. The rotor 4 is formed from a boss 5 attached to the input shaft 2, and an annular flange 6 extending outward from the boss 5 in the radial direction. The flange 6 is fitted in the front end of the boss 5. The inner circumferential portion of the flange 6 is partially caulked to clamp the boss 5, and is integrally coupled to the boss 5.

An annular groove 7 which has a U-shaped section and opens toward the back side of the electromagnetic clutch 1 is formed in the flange 6. Also, a plurality of arc slits 8 are formed in the flange 6. The slits 8 are formed to extend through a disc portion 9 forming the bottom of the annular groove 7 so that they extend in the circumferential direction of the flange 6. Two slits 8 are formed side by side in the radial direction at each of a plurality of portions of the disc portion 9 in the circumferential direction.

A field core 12 is supported at the back end of the boss 5 via a bearing 10 and rotation stop plate 11. The annular field core 12 is inserted in the annular groove 7 of the flange 6. An annular groove 12a which has a U-shaped section and opens toward the front side of the electromagnetic clutch 1 is formed in the field core 12. An exciting coil 13 is housed in the annular groove 12a.

The rotation stop plate 11 regulates rotation of the field core 12. The rotation stop plate 11 includes a cylindrical portion 14 in which the bearing 10 is fitted, and a flat portion 15 welded to a wall forming the bottom of the annular groove 12a in the field core 12. Although not shown, a rotation stop pin extending from a fixed housing is inserted in the rotation stop plate 11.

The cylindrical portion 14 is formed into a cylindrical shape by performing burring work for a plate-like base material. A ring-like abutment plate 16 is welded to the back-side opening portion of the cylindrical portion 14. The abutment plate 16 prevents the bearing 10 from slipping off the cylindrical portion 14. A caulking piece 14a is formed at the front-side opening portion of the cylindrical portion 14. An outer ring 10a of the bearing 10 is clamped by the abutment plate 16 and caulking piece 14a from two sides in the axial direction. That is, movement of the rotation stop plate 11 in the axial direction with respect to the bearing 10 is regulated by the abutment plate 16 and caulking piece 14a.

An inner ring 10b of the bearing 10 is fitted in a small-diameter portion 5a of the boss 5, and the pulley 3 abuts against the inner ring 10b from the back side. Thus, movement of the inner ring 10b of the bearing 10 in the axial direction is regulated by the pulley 3 and boss 5.

The back end of a cylindrical bearing collar 17 is fitted in and welded to the front end of the boss 5. A hub 19 is rotatably supported by the front end of the bearing collar 17 via a bearing 18. An inner ring 18a of the bearing 18 is pressed backward from the front by a press plate 20. The press plate 20 is pressed against the inner ring 18a by a fixing bolt 21 screwed into the input shaft 2. By screwing the fixing bolt 21 into the input shaft 2, the boss 5 of the rotor 4 and the first pulley 3 are fixed to the input shaft 2.

A second pulley 22 and leaf springs 23 are fixed to the hub 19 by rivets 25a. The second pulley 22 transmits power for driving the blade (blade for cutting a lawn: not shown) of the lawn mower. The free end of the leaf spring 23 is fixed to an armature 24 by a rivet 25. The armature 24 is formed from an annular plate facing the disc portion 9 of the rotor 4, and is supported by the hub 19 via the leaf spring 23. The leaf spring 23 biases the armature 24 in a direction (forward) in which the armature 24 is spaced apart from the rotor 4.

The electromagnetic clutch 1 further includes an annular brake plate 26 which abuts against the front surface of the armature 24 when the exciting coil 13 is in the non-exciting state. The brake plate 26 is supported by the rotation stop plate 11 via an adjusting mechanism 27. The adjusting mechanism 27 changes a position of the brake plate 26 in the front-and-back direction. The adjusting mechanism 27 is made up of a bolt 27a extending through the rotation stop plate 11 and brake plate 26, a helical compression spring 27b which presses forward the brake plate 26, and a nut 27c threadably fixed to the bolt 27a.

The armature 24 abuts against the inner peripheral portion of the brake plate 26 by the spring force of the leaf spring 23 when the exciting coil 13 is in the non-exciting state. That is, the inner peripheral portion of the brake plate 26 forms a stopper which abuts against the armature 24 that moves apart from the rotor 4 by the elastic return force of the leaf spring 23. Further, the inner peripheral portion of the brake plate 26 forms a brake disk which brakes inertial rotation of the armature 24. As a brake for preventing inertial rotation of the armature 24 after cutting off power transmission, there is a structure which attracts and brakes the armature 24 by using an electromagnet (see Japanese Utility Model Laid-Open No. 59-133845) or a permanent magnet (see Japanese Patent Laid-Open No. 7-190095), in addition to the structure shown in FIG. 5 (structure disclosed in Japanese Patent Laid-Open No. 59-133840).

The position of the brake plate 26 in the front-and-back direction is changed by tightening or loosening the nut 27c of the adjusting mechanism 27. The adjusting mechanism 27 therefore adjusts an air gap formed between the rotor 4 and the armature 24.

When the conventional electromagnetic clutch 1 having this structure is in the non-exciting state in which the exciting coil 13 is not energized, the input shaft 2, rotor 4, and pulley 3 rotate integrally, and rotation of the input shaft 2 is not transmitted to the pulley 22. In the exciting state in which the exciting coil 13 is energized, the armature 24 is magnetically attracted by the rotor 4, and the pulley 22 also rotates together with the input shaft 2.

The above-described conventional electromagnetic clutch 1 has a problem of high manufacturing cost. The manufacturing cost rises because the cost for manufacturing the rotation stop plate 11 which regulates rotation of the field core 12 is high. When manufacturing the rotation stop plate 11, the cylindrical portion 14 is formed by punching a thin plate into a predetermined shape by press work and performing burring work at the center of the punched plate. The inner circumferential surface of the cylindrical portion 14 requires finishing work including cutting work to have a hole for fitting a bearing. Further, the abutment plate 16 formed into a ring shape is welded to the back end of the cylindrical portion 14.

That is, burring work and cutting work for the rotation stop plate 11, welding operation for the rotation stop plate 11 and abutment plate 16, and the like need to be performed. In addition, the abutment plate 16 needs to be manufactured. As a result, the rotation stop plate 11 becomes expensive.

SUMMARY OF THE INVENTION

It is an object of the present invention to provide an electromagnetic clutch which reduces the manufacturing cost.

To achieve the above object, according to the present invention, there is provided an electromagnetic clutch comprising a first rotation transmission portion including a rotor in which an annular groove is formed, an annular field core which is inserted in the annular groove to allow a magnetic flux pass through the rotor, and is supported by the first rotation transmission portion via a first bearing, a rotation stop member which regulates rotation of the field core by connecting the field core to a fixed housing, a second rotation transmission portion which is arranged at a position where the rotor is sandwiched between the second rotation transmission portion and the field core, and is rotatably supported by the first rotation transmission portion via a second bearing, an armature which is arranged to face the rotor at an air gap and is supported by the second rotation transmission portion to be movable in an axial direction, and a spring member which biases the armature in a direction in which the armature is spaced apart from the rotor, wherein the first bearing is housed in a hollow portion of the field core and fitted on an inner circumferential surface of the field core, the rotation stop member includes a flat portion which is fixed to an end of the field core on a side opposite to the armature, and the flat portion is formed integrally with a retaining piece which projects toward the hollow portion of the field core and faces the first bearing when viewed from the axial direction of the field core.

According to the present invention, since the bearing need not be fitted on the rotation stop member, neither burring work nor cutting work need be performed for the rotation stop member. Since the bearing can be retained by part of the rotation stop member, an abutment plate other than the rotation stop member need not be formed. An operation to weld the abutment plate to the rotation stop member can be omitted. The rotation stop member which regulates rotation of the field core is fabricated easily, so an electromagnetic clutch can be provided at low cost.

DESCRIPTION OF THE PREFERRED EMBODIMENT

Figure 1:
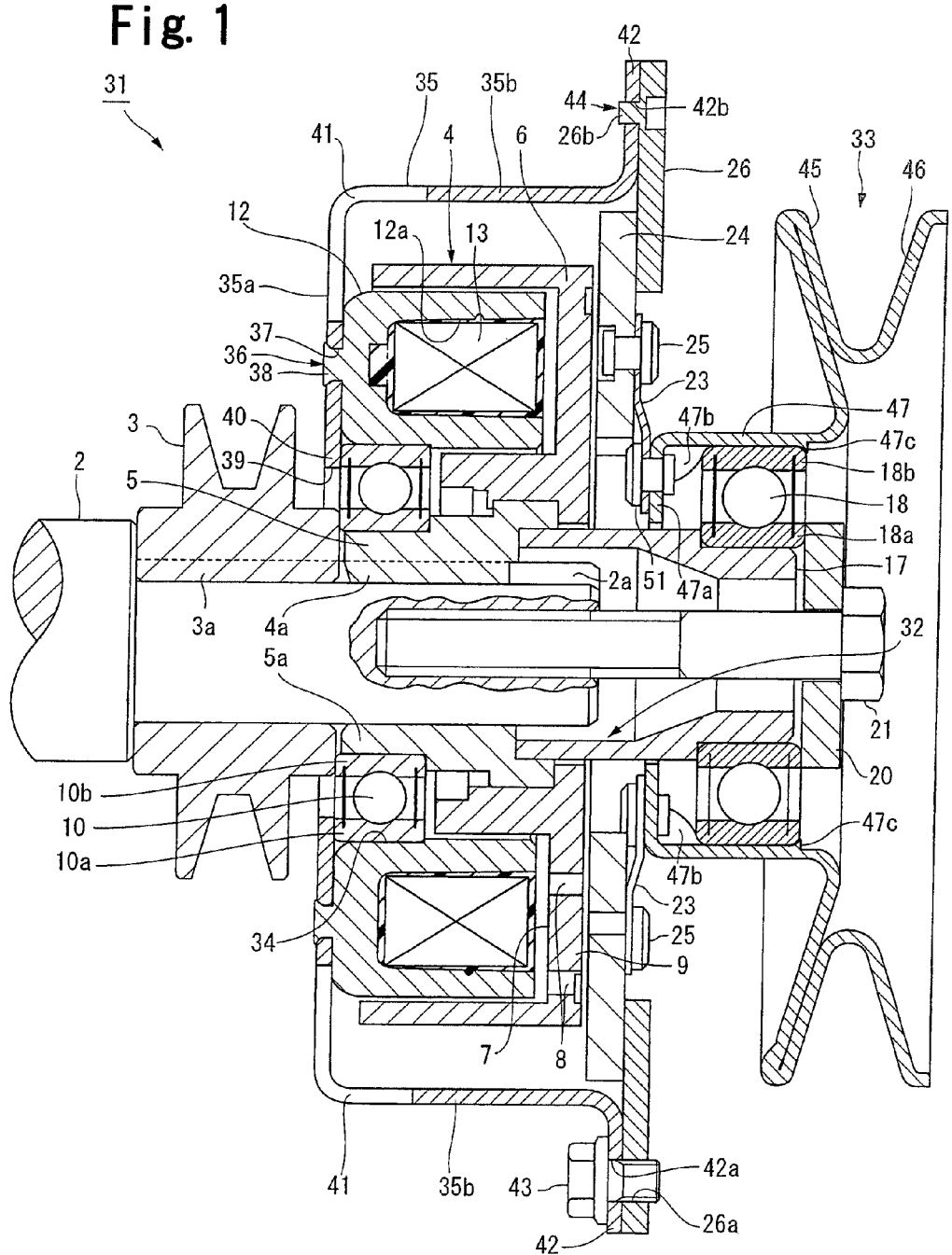
FIG. 1 is a sectional view of an electromagnetic clutch according to an embodiment of the present invention.

The present invention will now be described in detail with reference to the accompanying drawings. FIGS. 1 to 4 show an electromagnetic clutch according to an embodiment of the present invention. The same reference numerals as those in FIG. 5 denote the same or similar parts, and a detailed description thereof will be properly omitted. In the embodiment, for descriptive convenience, the distal end side (right side in FIG. 1) of an input shaft on which the electromagnetic clutch is mounted will be defined as the front side of the electromagnetic clutch, and the opposite side will be defined as the back side of the electromagnetic clutch.

An electromagnetic clutch 31 shown in FIG. 1 is switched between a coupling state in which rotation of a rotation transmission portion 32 (first rotation transmission portion) including a rotor 4 is transmitted to a rotation transmission portion 33 (second rotation transmission portion) via an armature 24, and a disconnection state in which transmission of the rotation is cut off. The rotation transmission portion 32 is formed from the rotor 4, and a cylindrical bearing collar 17 welded to the front end of the rotor 4. The rotor 4 is coupled to an input shaft 2 by key fitting, and rotates integrally with the input shaft 2 and a pulley 3.

The rotor 4 includes a boss 5 at the shaft center portion, and a flange 6 fixed to the outer circumferential portion of the boss 5. A small-diameter portion 5a is formed at the outer circumferential portion of the boss 5, and an inner ring 10b of a bearing 10 (first bearing) is fitted in the small-diameter portion 5a. A field core 12 is directly fitted on an outer ring 10a of the bearing 10.

The field core 12 is supported by the boss 5 via the bearing 10, and inserted into an annular groove 7 of the rotor 4 so that a magnetic flux passes through the rotor 4. A bearing fitting portion 34 capable of fitting the outer ring 10a of the bearing 10 is formed at the inner circumferential portion of the field core 12. The bearing 10 is fitted in the bearing fitting portion 34 while being housed in the hollow portion (hollow portion inward from the inner circumferential surface) of the field core 12. The bearing 10 is positioned inside the field core 12 so that its back end face is flush with the back end face of the field core 12. In the embodiment, the field core 12 is supported by the boss 5 of the rotor 4 via the bearing 10 without the mediacy of a rotation stop plate.

A rotation stop plate 35 (rotation stop member) is attached to the back end face of the field core 12. The rotation stop plate 35 has a function of regulating rotation of the field core 12 and a function of supporting brake plates 26. The rotation stop plate 35 can regulate rotation of the field core 12 by connecting the field core 12 via the rotation stop plate 35 to, e.g., a fixed housing (not shown) which houses the electromagnetic clutch 31.

Figure 2:
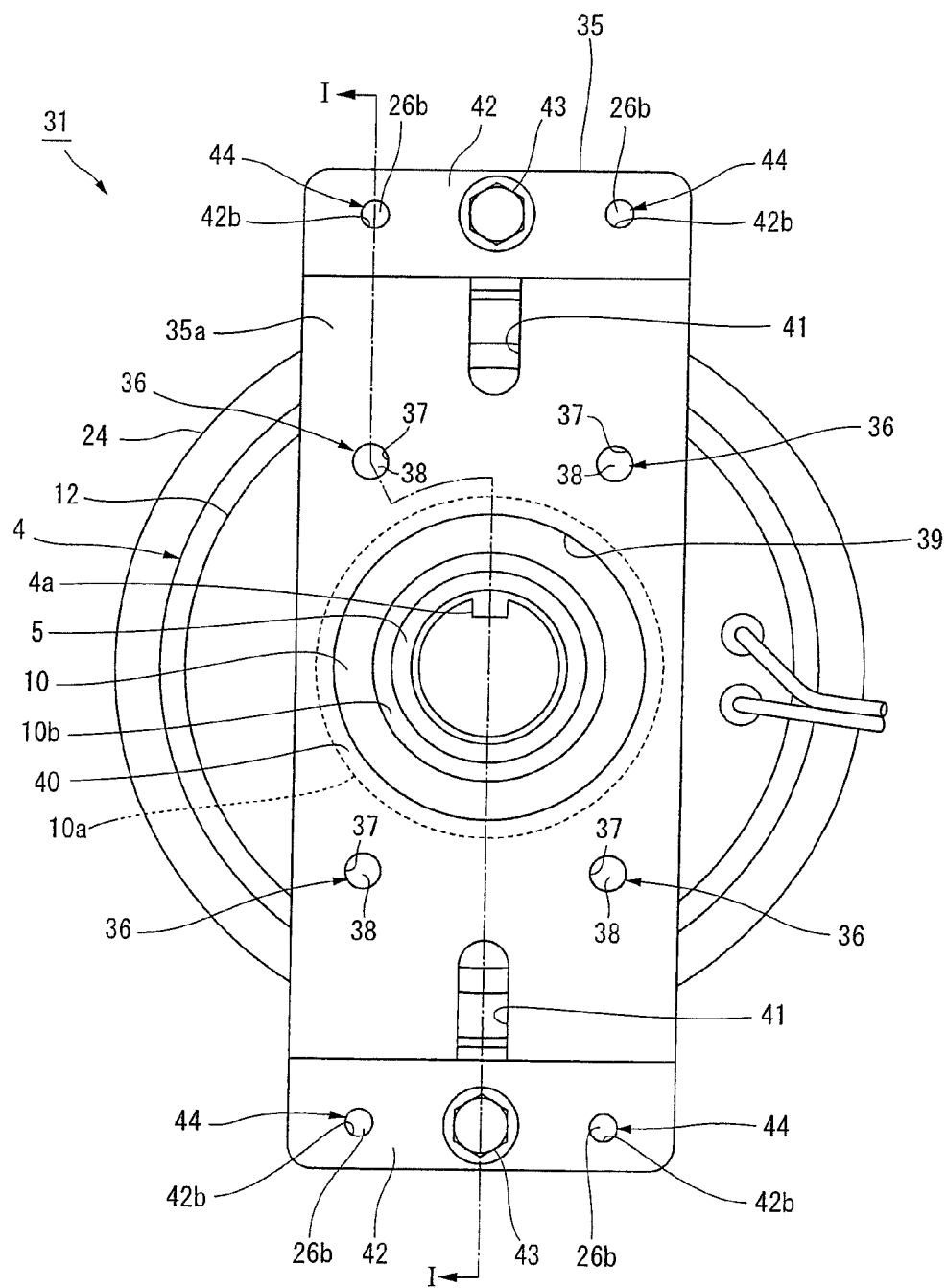
FIG. 2 is a front view of the electromagnetic clutch shown in FIG. 1, in which the cutaway position in FIG. 1 is indicated by a line I-I.
Figure 3:
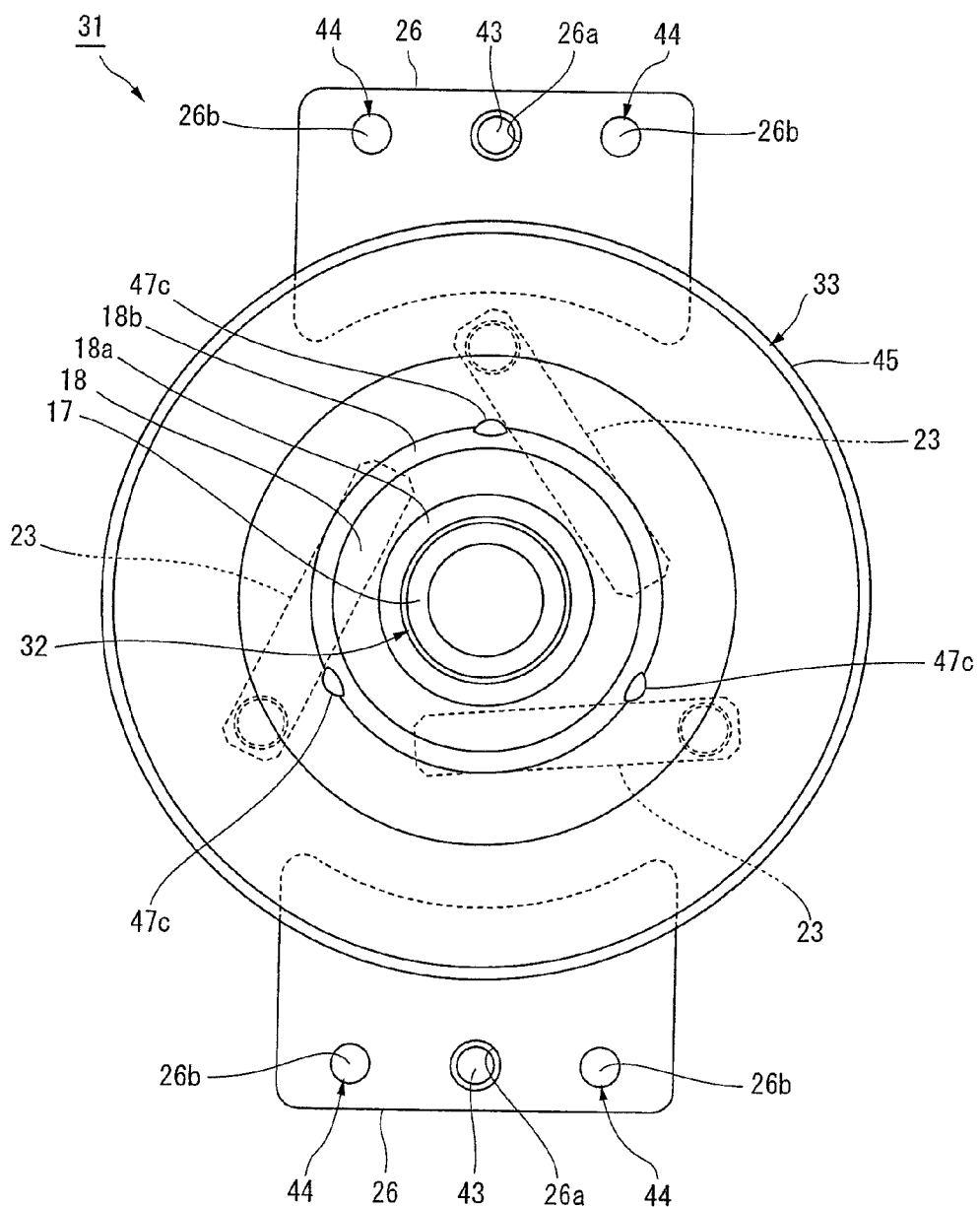
FIG. 3 is a rear view of the electromagnetic clutch shown in FIG. 1.

The rotation stop plate 35 is formed by bending a rectangular metal plate into a predetermined shape by press work. As shown in FIGS. 1 to 3, the rotation stop plate 35 has a U-shaped section to surround the field core 12 from its back.

More specifically, as shown in FIGS. 1 to 3, the rotation stop plate 35 includes a flat portion 35a extending in the radial direction of the field core 12 along the back end face of the field core 12, and two arms 35b extending from the two ends of the flat portion 35a parallelly in the axial direction of the input shaft 2.

The flat portion 35a is coupled to the field core 12 at a portion where the flat portion 35a overlaps the back end face of the field core 12 (an end of the field core 12 on a side opposite to the armature 24). As shown in FIG. 2, coupling portions 36 are formed at four positions of the flat portion 35a. Each coupling portion 36 is made up of a through hole 37 formed in the flat portion 35a, and a projection 38 of the field core 12 that is inserted in the through hole 37. The projection 38 is arranged on the back end face of the field core 12 to project backward.

Figure 4:
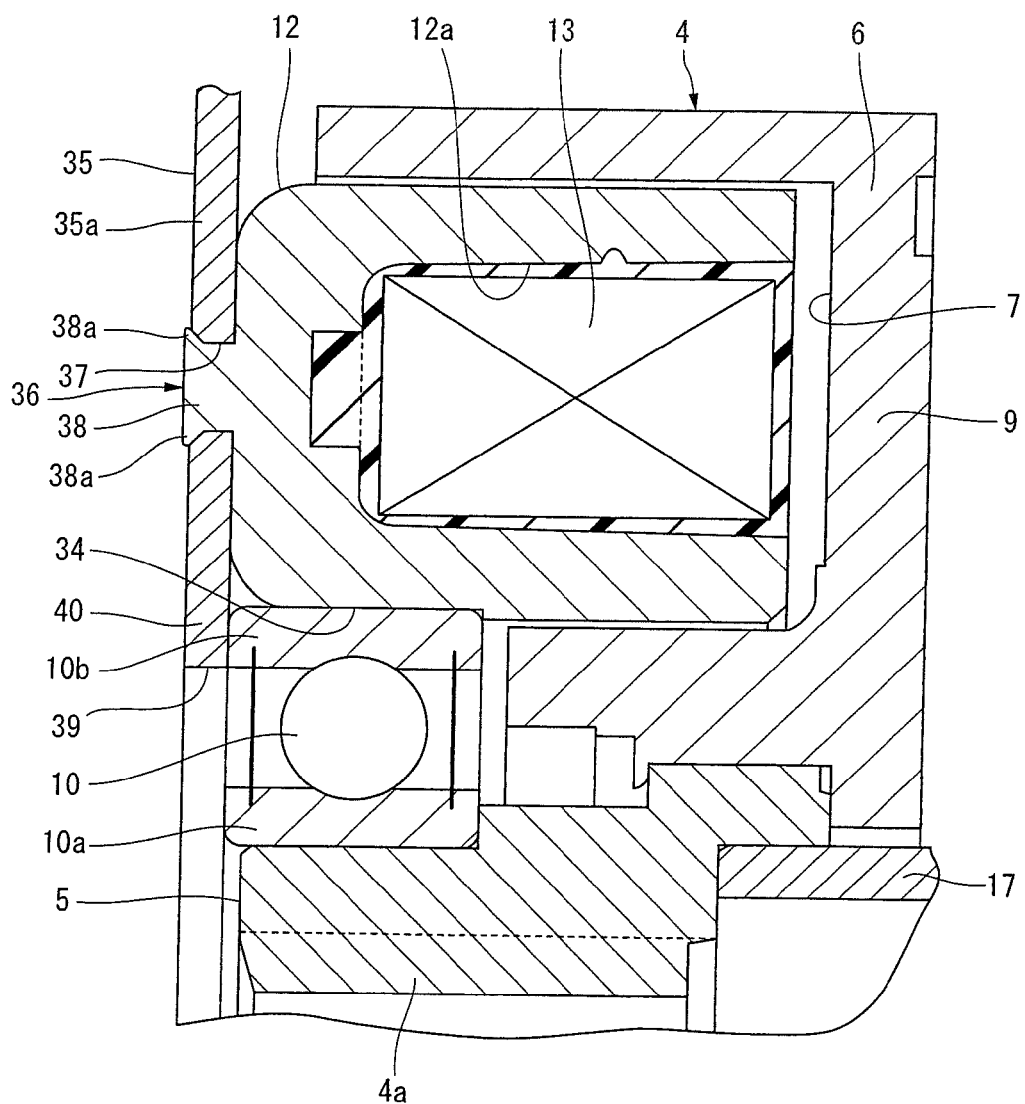
FIG. 4 is an enlarged sectional view showing the main part of the electromagnetic clutch shown in FIG. 1.
Figure 5:
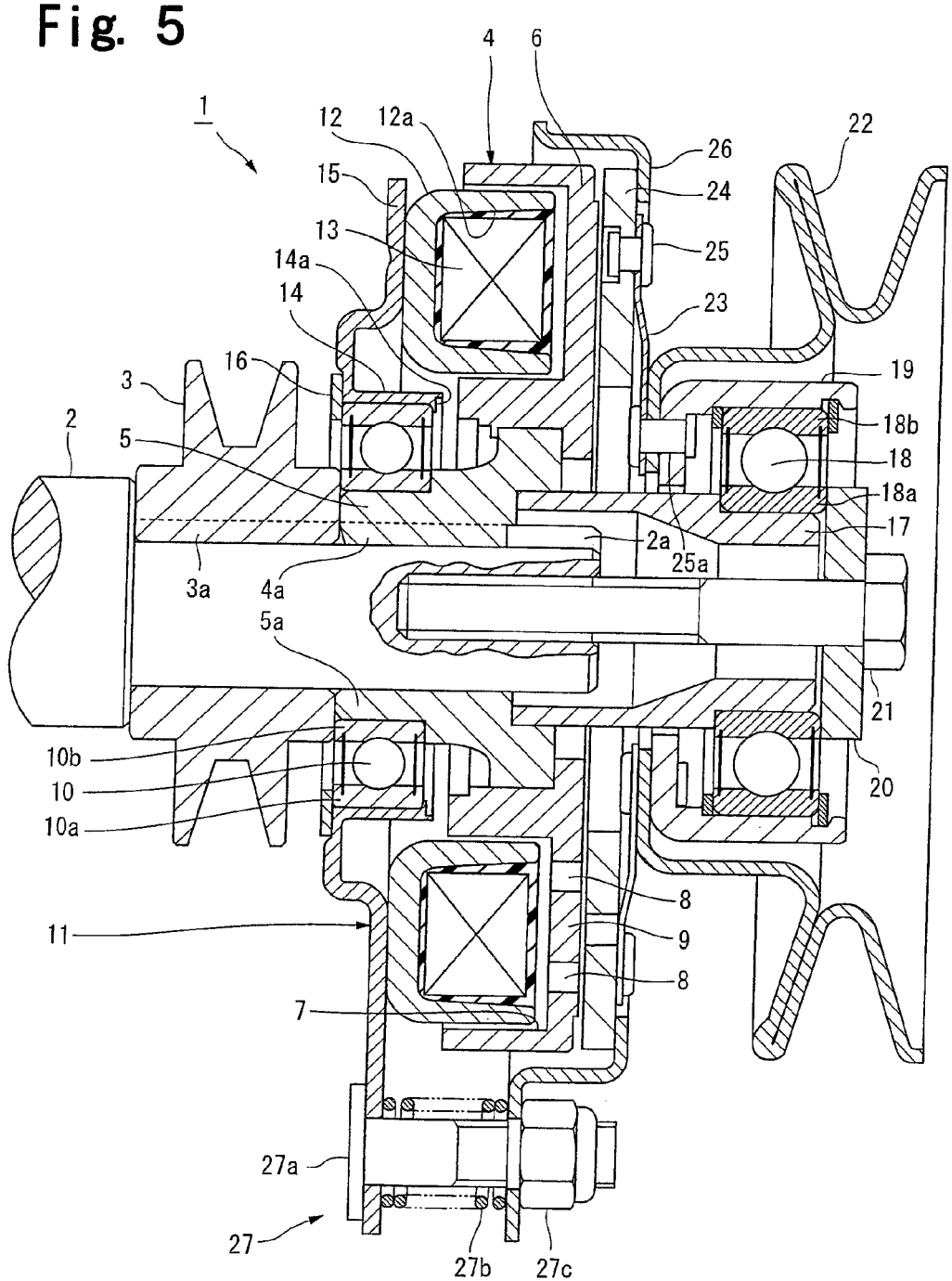
FIG. 5 is a sectional view of a conventional electromagnetic clutch.

The projection 38 is formed by plastically deforming part of the back end of the field core 12 by press work from the inside to outside of an annular groove 12a. The height (projection amount) of the projection 38 is set to be larger than the thickness of the flat portion 35a. More specifically, the flat portion 35a is superposed on the field core 12 to insert the projection 38 into the through hole 37, and the distal end of the projection 38 projects outside the through hole 37. To couple the flat portion 35a to the field core 12, the projecting end of the projection 38 is crushed and spread by press work, and pressed against the back surface of the flat portion 35a. That is, a plastically deformed portion 38a which is crushed outside the through hole 37 and spreads outward in the radial direction of the through hole 37 is formed at the distal end of the projection 38 that is exposed at the coupling portion 36, as shown in FIG. 4.

As shown in FIG. 2, a circular hole 39 is formed at the center of the flat portion 35a so that the boss 5 of the rotor 4 extends through it. The diameter of the hole 39 is set to be larger than the outer diameter of the inner ring 10b of the bearing 10 and smaller than the outer diameter of the outer ring 10a of the bearing 10. In the embodiment, the diameter of the hole 39 is formed to be equal to that of the outer ring 10a, as shown in FIGS. 1 and 2. A retaining piece 40 which projects toward the hollow portion of the field core 12 and faces the bearing 10 when viewed from the axial direction of the field core 12 is formed integrally with the flat portion 35a of the rotation stop plate 35. The retaining piece 40 substantially functions as a retaining ring for the bearing 10.

Holes 41 each for inserting a connection member (not shown) to connect the rotation stop plate 35 and the fixed housing (not shown) are formed at two ends (upper and lower ends in FIG. 2) of the flat portion 35a in the longitudinal direction.

As shown in FIG. 1, each arm 35b of the rotation stop plate 35 extends to the vicinity of the armature 24 outward in the radial direction of the field core 12 and rotor 4. A mounting plate 42 for mounting the brake plate 26 (brake member) is formed at the distal end of each arm 35b. The mounting plate 42 is formed by bending the distal end of the arm 35b outward in the radial direction of the field core 12. As shown in FIG. 1, the brake plates 26 are fixed to the paired mounting plates 42 formed on the rotation stop plate 35 by fixing bolts 43, and face an end face (front surface) of the armature 24 on a side opposite to the rotor 4.

Each brake plate 26 is formed to be horizontally elongated at the same width as that of the rotation stop plate 35. A length of the brake plate 26 in the longitudinal direction, that is, a length in the radial direction of the field core 12 is set so that the brake plate 26 extends inward from the mounting plate 42 in the radial direction of the field core 12, as shown in FIG. 1. The brake plate 26 extends inward in the radial direction to the vicinity of an armature fixing rivet 25.

When the brake plate 26 wears, the gap between the armature 24 and a disc portion 9 of the rotor 4 is widened, and the time until the armature 24 is magnetically attracted by the rotor 4 is prolonged. As a measure against this, the brake plate 26 has obverse and reverse surfaces with the same shape and same array so that the two, obverse and reverse surfaces can be used by turning over the brake plate 26. When the obverse surface (one surface) of the brake plate 26 that is pressed against the armature 24 wears, the brake plate 26 is detached from the armature 24, turned over, and then attached again to the armature 24 with the unworn reverse surface (the other surface unused) facing the armature 24.

Each fixing bolt 43 is threadably fixed in a threaded hole 26a of the brake plate 26 via a through hole 42a of the mounting plate 42. As shown in FIGS. 2 and 3, engaging portions 44 for determining the position of the brake plate 26 with respect to the rotation stop plate 35 are provided on the two sides of the fixing bolt 43. Each engaging portion 44 is made up of a through hole 42b formed in the mounting plate 42, and a columnar projection 26b which projects from the brake plate 26 to be fitted in the through hole 42b. The brake plate 26 and mounting plate 42 are arranged at a position where the armature 24 faces the disc portion 9 of the rotor 4 at a predetermined air gap while the front surface of the armature 24 abuts against the brake plate 26.

The armature 24 formed into a ring shape is supported by a plurality of leaf springs 23 (spring members) at the rotation transmission portion 33 so as to be movable in the axial direction. The leaf springs 23 bias the armature 24 in a direction in which the armature 24 is spaced apart from the rotor 4. When an exciting coil 13 of the field core 12 is in the non-exciting state, the armature 24 is pressed against the brake plates 26 by the spring force of the leaf springs 23. At this time, the brake plates 26 brake rotation of the armature 24 by friction.

The rotation transmission portion 33 is formed from a pulley 45. The pulley 45 is arranged at a position where the rotor 4 is sandwiched between the pulley 45 and the field core 12. The pulley 45 is a so-called sheet-metal pulley. As shown in FIG. 1, the pulley 45 is made up of a pulley main body 46 around which a V belt (not shown) is wound, and a cylindrical portion 47 formed at the inner circumferential portion of the pulley main body 46. The cylindrical portion 47 is rotatably supported by the bearing collar 17 via a bearing 18. An inner ring 18a of the bearing 18 is fitted on the outer circumferential portion of the bearing collar 17, and is fixed to the bearing collar 17 by a press plate 20 and fixing bolt 21. An outer ring 18b of the bearing 18 is fitted on the inner circumferential surface of the cylindrical portion 47.

An inner flange 47a, and a projection 47b which abuts against the outer ring 18b of the bearing 18 (second bearing) are arranged at the front end of the cylindrical portion 47 near the armature 24. One end of the leaf spring 23 is fixed to the inner flange 47a by a rivet 51. Caulking pieces 47c which abut against the outer ring 18b of the bearing 18 are formed at the back end of the cylindrical portion 47. Each caulking piece 47c is formed so that part of the inner circumferential portion of the cylindrical portion 47 projects inward in the radial direction by press work. The caulking pieces 47c are pressed against the front end face of the outer ring 18b from the front. The caulking pieces 47c therefore have a function of preventing the bearing 18 from slipping forward from the cylindrical portion 47.

In the electromagnetic clutch 31 having this structure, when the exciting coil 13 is excited and the rotor 4 magnetically attracts the armature 24, rotation of the input shaft 2 is transmitted from the rotor 4 to the pulley 45 via the armature 24 and the leaf springs 23. After energization to the exciting coil 13 is stopped, the armature 24 is moved apart from the rotor 4 by the spring force of the leaf springs 23 and pressed against the brake plate 26. Hence, rotation of the armature 24 is braked by frictional force, and rotation of the rotation transmission portion 33 including the armature 24 stops.

The bearing 10 is directly attached to the field core 12 of the electromagnetic clutch 31. Since the bearing 10 need not be fitted on the rotation stop plate 35, neither burring work nor cutting work need be performed necessarily for the rotation stop plate 35. Since the bearing 10 can be retained by part (retaining piece 40) of the rotation stop plate 35, an abutment plate other than the rotation stop plate 35 is unnecessary. Thus, an operation to weld the abutment plate to the rotation stop plate 35 is omitted. The rotation stop plate 35 which regulates rotation of the field core 12 can be fabricated easily, so an electromagnetic clutch can be provided at low cost.

The coupling portion 36 between the rotation stop plate 35 and the field core 12 in the embodiment is made up of the through hole 37 formed in the rotation stop plate 35, and the projection 38 of the field core 12 that is inserted in the through hole 37. At the distal end of the projection 38, the plastically deformed portion 38a which is crushed outside the through hole 37 and spreads outward in the radial direction of the through hole 37 is formed. This obviates the need for a welding operation in fixing the rotation stop plate 35 to the field core 12, and thus an electromagnetic clutch can be provided at lower manufacturing cost.

In the embodiment, the rotation stop plate 35 has the arms 35b extending outward to the vicinity of the armature 24 in the radial direction of the field core 12 and rotor 4. The brake plate 26 is fixed to the distal end of each arm 35b to face an end face of the armature 24 on a side opposite to the rotor 4. When the exciting coil 13 of the field core 12 is in the non-exciting state, the brake plates 26 brake rotation of the armature 24 by pressing the armature 24 against the brake plates 26 by the spring force of the leaf springs 23.

Since the brake plate 26 can be directly fixed to the rotation stop plate 35, the structure becomes simpler and can be assembled more easily, compared to a case in which an adjusting mechanism is arranged at the support portion of the brake plate 26. Although the electromagnetic clutch includes the brake which brakes inertial rotation of the armature 24, the number of components and the number of assembly processes can be decreased, further reducing the manufacturing cost.

In the embodiment, the rotation transmission portion 33 is formed from a sheet-metal pulley (second pulley 45) rotatably supported by the bearing 18 at the rotation transmission portion 32. The sheet-metal pulley includes the cylindrical portion 47 in which the bearing 18 is fitted. The armature 24 is attached via the leaf spring 23 to one end of the cylindrical portion 47 near the armature 24. The caulking pieces 47c which abut against the end face of the bearing 18 are formed at the other end of the cylindrical portion 47.

Since the sheet-metal pulley is directly fitted on the bearing 18, no hub is necessary between the bearing 18 and the sheet-metal pulley. Further, the caulking pieces 47c formed on the sheet-metal pulley retain the bearing 18, so a component dedicated for retention can be omitted. As a result, the number of components at the rotation transmission portion 33 can be reduced, and an electromagnetic clutch can be provided at lower manufacturing cost.

What is claimed is:

1. An electromagnetic clutch comprising:
    a first rotation transmission portion including a rotor in which an annular groove is formed;
    an annular field core which is inserted in the annular groove to allow a magnetic flux pass through the rotor, and is supported by said first rotation transmission portion via a first bearing;
    a rotation stop member which regulates rotation of said field core;
    a second rotation transmission portion which is arranged at a position where the rotor is sandwiched between said second rotation transmission portion and said field core, and is rotatably supported by said first rotation transmission portion via a second bearing;
    an armature which is arranged to face the rotor at an air gap and is supported by said second rotation transmission portion to be movable in an axial direction; and
    a spring member which biases said armature in a direction in which said armature is spaced apart from the rotor,
    wherein the first bearing is housed in a hollow portion of said field core and fitted on an inner circumferential surface of said field core,
    said rotation stop member includes a flat portion which is fixed to an end of said field core on a side opposite to said armature, and
    the flat portion is formed integrally with a retaining piece which projects toward the hollow portion of said field core and faces the first bearing when viewed from the axial direction of said field core.

2. A clutch according to claim 1, further comprising a coupling portion which couples said rotation stop member and said field core,
    wherein said coupling portion is formed from a through hole which is formed in said rotation stop member, and a projection of said field core that is inserted in the through hole, and
    the projection includes a plastically deformed portion which is formed by crushing a distal end extending through the through hole and spreads outward in a radial direction of the through hole.

3. A clutch according to claim 1, wherein
    said rotation stop member includes an arm which extends to a vicinity of said armature outward in a radial direction of said field core and the rotor,
    a brake member is fixed to a distal end of the arm to face an end face of said armature on a side opposite to the rotor, and
    the brake member brakes rotation of said armature pressed by a spring force of said spring member when an exciting coil of said field core is in a non-exciting state.

4. A clutch according to claim 3, wherein
    the brake member has two surfaces formed into the same shape, and
    when one surface of the brake member that is pressed against said armature wears, the brake member is detached from the arm, turned over to make the other unworn surface face said armature, and fixed again to the distal end of the arm.

5. A clutch according to claim 1, wherein
    said second rotation transmission portion is formed from a sheet-metal pulley which is rotatably supported by the second bearing at the first rotation transmission portion,
    the sheet-metal pulley includes a cylindrical portion on which the second bearing is fitted,
    said armature is attached via said spring member to one end of the cylindrical portion near said armature, and
    a caulking piece which abuts against an end face of the second bearing is formed at the other end of the cylindrical portion.

* * * * *